United States Patent [19]

Mock

[11] Patent Number: 4,640,314

[45] Date of Patent: Feb. 3, 1987

[54] ENCLOSED CONDUIT

[75] Inventor: Donald E. Mock, San Dimas, Calif.

[73] Assignee: Kirkhill Rubber Company, Brea, Calif.

[21] Appl. No.: 633,638

[22] Filed: Jul. 23, 1984

[51] Int. Cl.[4] .............................................. F16L 9/22
[52] U.S. Cl. ..................................... 138/162; 138/92; 138/157; 174/101
[58] Field of Search ................ 138/92, 156, 157, 162, 138/164, 163, 166, 168; 174/68 C, 101

[56] References Cited

U.S. PATENT DOCUMENTS

| | | | |
|---|---|---|---|
| 3,055,399 | 9/1962 | Bush et al. | 138/157 |
| 3,229,029 | 1/1966 | Weiss | 138/92 X |
| 3,377,756 | 4/1968 | Polhamus | 138/166 X |
| 3,761,603 | 9/1973 | Hays et al. | 138/157 X |
| 4,156,795 | 5/1979 | Lacan | 174/101 X |
| 4,484,020 | 11/1984 | Lööf et al. | 174/101 X |

FOREIGN PATENT DOCUMENTS

| | | | |
|---|---|---|---|
| 2201211 | 7/1973 | Fed. Rep. of Germany | 174/101 |
| 2406327 | 11/1979 | France | 138/162 |
| 443432 | 2/1968 | Switzerland | 174/101 |
| 1303433 | 1/1973 | United Kingdom | 174/68 C |
| 1410423 | 10/1975 | United Kingdom | 174/101 |
| 2132421 | 7/1984 | United Kingdom | 174/101 |

*Primary Examiner*—James E. Bryant, III
*Attorney, Agent, or Firm*—Edward D. O'Brian; K. H. Boswell

[57] ABSTRACT

An enclosed conduit for use with cables, wires, lines and the like is preferably constructed using two separate extrusions which is formed of a self supporting resilient material. The first of these is a U-shaped base having side edges, the second is a cover adapted to overly the base between the side edges of the base, this cover having side edges. Coacting structures on the side edges of both the base and the cover permit the base and the cover to be snapped together or apart. An auxiliary retainer on the cover adjacent to the side edges of the cover are used to inhibit the inward deflection of the sides of the base when the cover is in place.

2 Claims, 5 Drawing Figures

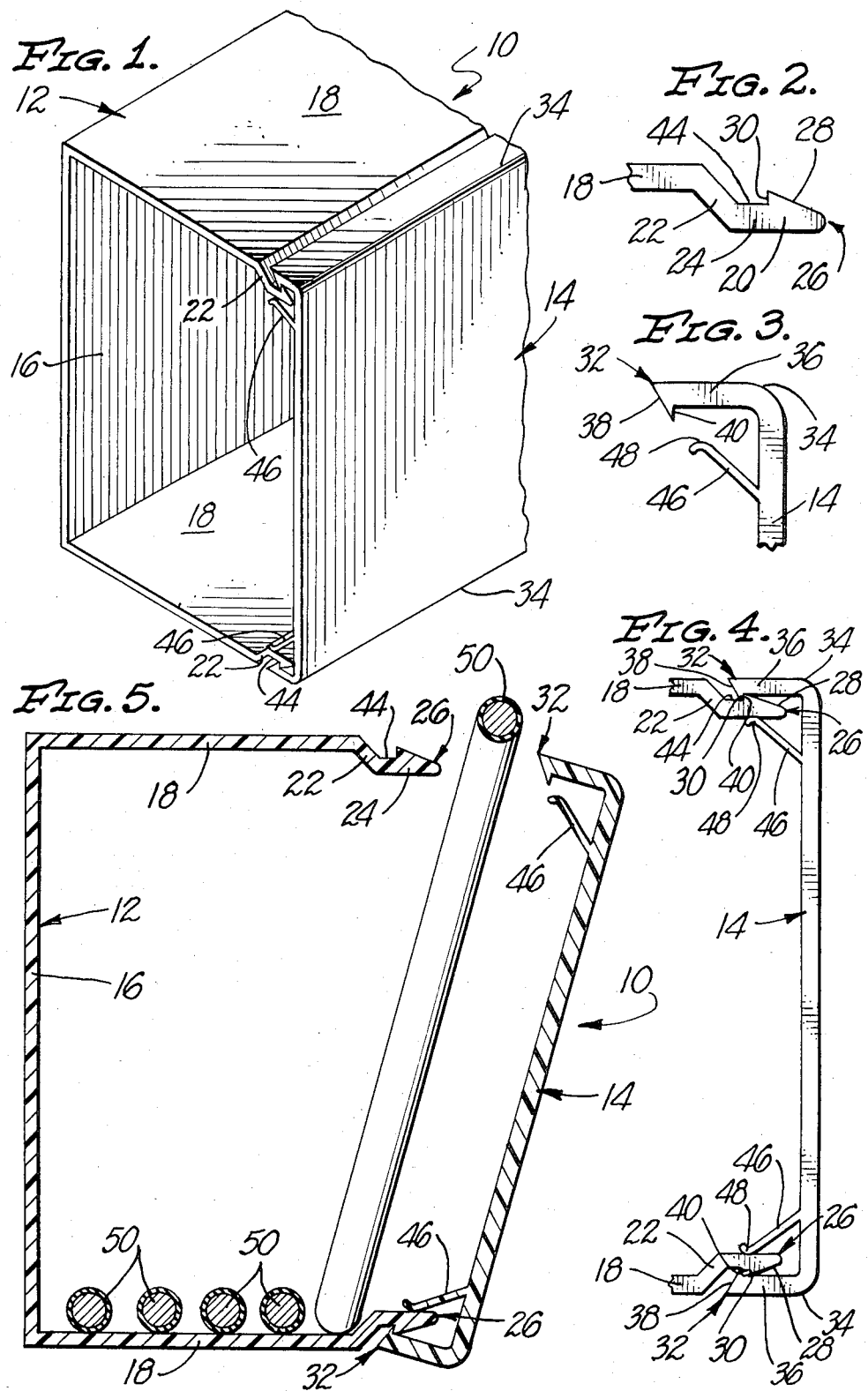

ENCLOSED CONDUIT

BACKGROUND OF THE INVENTION

The specification pertains to a new and improved type of conduit which is intended to be utilized in supporting various types cables, lines, and the like.

In the past a wide variety of different types of enclosed conduits have been developed and used for the purposed of holding cables, wires, lines and the like. As a result of experience it was realized many years ago that in many applications it is most advantageous to use conduit for such purposes which was formed so as to include a generally U-shaped base and a lid or cover mounted on the base so as to enclose the space generally between the sides of the base. With conduit of this type the cover was normally constructed so it could be removed from the base so as to provide easy access to the space within the conduit interior.

Although such enclosed conduits having a base and a removable cover for the base have been constructed in many different manners it is believed that it is normally considered best to manufacture them utilizing two separate extrusions—a base extrusion and a cover extrusion—formed of resilient, self supporting polymer material capable of resisting normal ambient influences. These are frequently manufactured of a polyvinyl composition. These extrusions are usually shaped so as to permit the lid to be snapped on the base in order to enclose the space or volume generally between the sides of the base. Any such construction has required the use of coacting parts or so-called "means" on both the side edges of the base and side edges of the cover so as to secure the cover in place. Such coacting means may be of such a character that they can be referred to as detent or the latch means.

Unfortunately a structure of the latter catagory is not as desirable as one might reasonably like because of the fact that it normally will have been constructed in such a manner that the cover can come off of the base relatively easily. This is not to be taken as indicating that prior structures as noted are undesirable. They are utilitarian. However, on occasion complications have arisen as a result of vandals being able to easily open such conduits or as a result of the covers tending to separate from the bases as a result of various forces of one type or another, being applied to the conduit. Further, when such prior closed conduits are used with the covers vertically oriented it has been relatively difficult to enclose within such conduits a large number of cables, lines, wires or the like while concurrently retaining the ability to easily close the cover of such a conduit.

BRIEF SUMMARY OF INVENTION

As a result of the preceeding considerations it is believed that it will be apparent that there is a need for new and improved conduits which are specifically designed for use in supporting cables, lines and the like. More specifically it is considered there is a need for such conduits that overcome the limitations and disadvantages of prior related conduits as indicated in the preceeding discussion. An objective of the present invention is to fulfill both of these needs. More specifically the invention is intended to provide a new type of enclosed conduit which can be easily manufactured at a relatively normal cost, which is of such a character that it is difficult to open and yet which can be opened without significant difficulty when this is required.

A further objective of the invention is to provide enclosed conduit as subsequently indicated in which the cover is formed so that coacting means on the cover and on the base and on auxiliary retainer on the cover permit the cover to be attached to and held by an edge of a side of a base in a position in which the cover extends relative to the base in more or less the manner in which a partially opened box lid extends relative to the box. Further objectives are to provide conduit as indicated which can be easily utilized and which is sufficiently difficult to detach to discourage vandals from gaining access to the interior of the conduit but which can be opened whenever reasonably required.

In accordance with this invention these are achieved by providing an enclosed conduit having a base of a uniform cross-sectional configuration throughout its length, said base included in opposed sides terminating in spaced, parallel side edges and having a cover of uniform cross-sectional configuration throughout its length, said cover enclosing the space between said side edges of said base and having spaced parallel side edges located adjacent to the side edges of said base, both said side edges of said base of said edges of cover including coacting means enabling said cover to be snapped onto and off of said base in which the improvement comprises: said coacting means on both said side edges of said base and on said side edges of said cover including catch surface means, said catch surface means being shaped so as to permit said cover to be snapped onto said base with adjacent catch surfaces means on exterior of said side edges of said base facing outwardly, generally away from one another and with said catch surfaces on said side edges of said cover extending generally towards one another, an auxiliary retainer means on said cover adjacent to and spaced from each of said side edges of said cover, said auxiliary retainers being located so as to inhibit the deflection of the sides of said base when said cover is located on said base by engaging the side edges of said base.

BRIEF DESCRIPTION OF DRAWING

The invention is best explained in the accompanying drawing in which:

FIG. 1 is an isometric view of a comparatively short length of a presently preferred form of an assembled, enclosed conduit in accordance with this invention, FIG. 2 is an enlarged fragmentary view showing the profile of a side edge of a side of the base used in the conduit, FIG. 3 is an enlarged fragmentary view showing the profile of the side edge of the cover used with the conduit in the FIG. 1, FIG. 4 is a partial end elevational view showing how the side edges of the base and the cover of the conduit fit with respect to one another when the cover is assembled on the conduit, and FIG. 5 is a cross sectional view showing a conduit as shown in FIG. 1 is use with the cover being held at one of its edges and pivoted so that the other of its edges is spaced from the side edge of the side of the base adjacent to it.

It will be realized from a review of the drawing and a consideration of the remainder of this specification that the drawing shows a specific structure utilizing the concepts or principles of the invention. These are as set forth in the appended claim. These same principles or concepts can be easily embodied within a variety of differently appearing, differently constructed conduits by using routine engineering skill.

DETAILED DESCRIPTION

In the drawing there is shown a conduit 10 of the present invention which includes a base 12 and a cover 14. Both the base 12 and the cover 14 are preferably formed by extruding a somewhat resilient, self supporting material such as polyvinyl chloride or a related vinyl copolymer composition. When the base 12 and cover 14 are so formed it will be realized that they both will be of uniform cross sectional configuration throughout there lengths. Although vinyl compositions have been specified in this discussion for use in forming the base 12 and cover 14 it is to be understood that these two parts may be formed out of any composition reasonably capable of withstanding normal ambient influences, and having the physical properties necessary for the conduit 10 to be opened and closed as hereinafter discussed.

The base 12 is formed so as to include a bottom 16 capable of being secured to a supporting wall (not shown) in any convenient manner. This bottom 16 carries parallel upstanding sides 18 which are spaced from side edges 20 by generally inwardly directed, slanting offsets 22. Preferably the offsets 20 are identical. The side edges 20 include parallel, outwardly extending edge walls 24, each of which is provided with what may be referred to as a latch head 26. These latch heads 26 include sloping walls 28 leading to catch surfaces 30. These catch surfaces 30 extend outwardly from the edge walls 24 away from one another so as to be perpendicular to the edge walls 24 and the sides 18. The sloping walls 28 serve as ramps leading to these catch surfaces 30.

The cover 14 is also provided with latch heads 32 corresponding to the heads 26 on side edges 34 of this cover 14. These latch heads 32 are located on edge walls 36 extending perpendicularly from the cover 14 generally towards the base 12. They are provided with sloping walls 38 leading to other catch surfaces 40. The edge walls 36 are located with respect to one another so as to be slightly further apart than the edge walls 24. These edge walls 36 are constructed so that when the cover 14 is placed on and pushed toward the base 12 the sloping walls 28 and 38 will first engage one another. The applied force will then cause a minor amount of temporary deformation of the material present in the cover 14 and the sides 18. As the cover 14 is pressed in place this will result in a snapping type of action after the walls 28 and 38 slide past one another. When this occurs the edge walls 24 and 36 will return to there initial configurations allowing the catch surfaces 30 and 40 to engage one another.

When the cover 14 is attached in this manner the edge walls 36 will appear substantially as extensions of the sides 18. This is considered preferable in minimizing the chances of the cover 16 being ripped off due to an inadvertant snagging or the like. It is noted that the angle between the sloping walls 38 and the catch surfaces 40 on the edge walls 36 is less than the angle between the sloping walls 28 and the catch surfaces 30 on the side walls 24. It is considered important to provide a gap 44 between the sloping walls 30 and the offsets 22. When the cover is assembled on the base 12 such a gap 44 provides room whereby a tool such as a straight bladed screw driver or similar manipulative tool can be be inserted to temporarily deform the cover 14 and/or the base 12 to the extent necessary to release the cover 14 from the base 12.

With the present invention the cover 14 also includes 2 auxiliary retainers 46, each appearing as a comparatively thin, resilient wall extending diagonally relative to cover 14 adjacent to a side edge 34. Each wall 46 terminates in a curved lip 48 which is spaced from a corresponding edge wall 36 a sufficient distance to permit assembly of cover 14 on the base 12. Each of these retainers 46 is spaced from and parallel to an adjacent side edge 34 to such an extent that it is temporarily deformed when moved and out of the position in which the surfaces 30 and 40 are engaged. These auxiliary retainers 46 serve a very important function, when a comparatively moderate amount of force is placed on a side 18 of an assembled conduit 10 the adjacent retainer 46 will "backup" the side edge 20 associated with such side 18, making it relatively difficult to move the side 18 a sufficient amount to disengage the catch surfaces 30 and 40 which are adjacent to the side 18 where the force is being applied. As a consequence of this there is minimal chance of a assembled conduit 10 being opened by other than a determined individual. Nevertheless the conduit 10 can be opened by such a person as a result of the flexibility of the retainers 44.

These retainers 46 serve another function as illustrated in FIG. 5. When two adjacent side edges 20 and 34 are disangaged while the other two side edges 20 and 34 are not disengaged the retainer 46 associated with the non disengaged side edges 20 and 34 will fit along the non-disengaged edge wall 24 as illustrated in FIG. 5. This will maintain the side edge 34 associated with such retainer 46 in contact with this particular edge wall 24 and will result in the cover 14 being held so it can be provided to a position as indicated in FIG. 5. In such a position the cover 14 is partially open as to permit access to pipes, conduits, or various type of lines 50 within the conduit 10. This is considered to be quite important. When the conduit 10 is nearly filled with such items 50 the cover 14 will prevent them from spilling out of the base 12 during such times there is access to the interior of this conduit 10.

I claim:

1. An enclosed conduit having a base of uniform cross-sectional configuration throughout its length, said base including opposed sides terminating in spaced, parallel edge walls and having a cover of uniform cross-sectional configuration throughout its length, said cover enclosing the space between said edge walls of said base and having spaced parallel edge walls located so as to extend along the sides of said edge walls of said base which are remote from one another, both said edge walls of said base and of said cover including coacting means for securing said cover in place, said coacting means enabling said cover to be snapped onto and off of said base in which the improvement comprises:

said coacting means on both said base and on said cover each including a sloping wall leading to a catch surface, both of said catch surfaces being shaped so as to permit said cover to be snapped onto said base with adjacent catch surfaces on the exterior of said edge walls of said base facing outwardly, generally away from one another and with said catch on said edge walls of said cover extending generally towards one another;

auxiliary retainer walls for inhibiting the deflection of said sides of said base located on said cover adjacent to and spaced from each of said edge walls of said cover, each of said auxiliary retainer walls having a terminal end which extends parallel to an adjacent edge wall of said cover and extends diagonally from said cover generaly towards said auxiliary retainer wall terminal end so as to inhibit the deflection on the sides of said base when said cover is located on said base by engaging the side walls of said base;

said coacting means and said auxiliary walls being of such a configuration as to serve as a pivot structure such that an edge wall of said cover can be rotated relative to the outer edge wall of said base adjacent to it while the other edge wall of said cover is engaged with the outer edge wall of said base adjacent to it so as to serve as a pivot structure such as to permit limited rotation of said cover relative to said base so as to be in a partially open position;

said edge walls of said base are separated from the remainder of said base by offsets;

said edge walls of said cover appear as extensions of said sides of said base and are spaced from said offsets by gaps, said gas being sufficiently large to receive a manipulative tool used to deform said base to the extent necessary to release said cover;

said auxiliary walls fit internally of said edge walls of said base so as to make it relatively difficult to move said sides of said base so as to disengage said catch surfaces.

2. An enclosed conduit as claimed in claim 1 wherein:

said auxiliary walls are resilient and are spaced so that they are temporarily deformed when said coacting means are being moved into or out of a position in which they are engaged.

* * * * *